Figure 1:
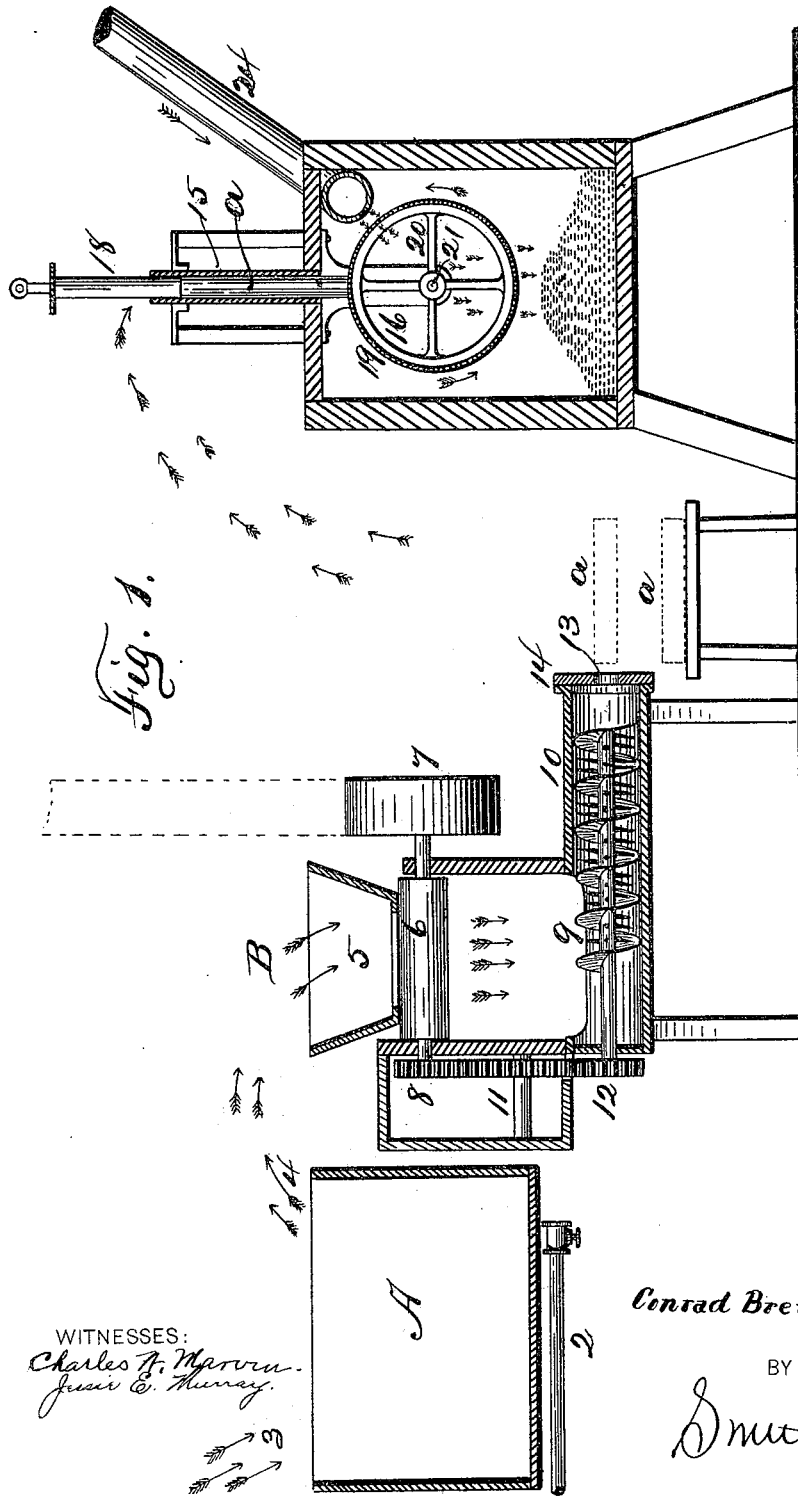

No. 621,212. Patented Mar. 14, 1899.
C. BREITSCHWERTH.
PROCESS OF PREPARING CLAY FOR MANUFACTURING POTTERY, &c.
(Application filed Apr. 18, 1895.)

(No Model.) 2 Sheets—Sheet 1.

INVENTOR
Conrad Breitschwerth.

No. 621,212. Patented Mar. 14, 1899.
C. BREITSCHWERTH.
PROCESS OF PREPARING CLAY FOR MANUFACTURING POTTERY, &c.
(Application filed Apr. 18, 1895.)

(No Model.) 2 Sheets—Sheet 2.

WITNESSES:
Charles W. Marvin.
Jessie E. Murray

INVENTOR
Conrad Breitschwerth.
BY
Smith & Denison
ATTORNEYS.

THE NORRIS PETERS CO., PHOTO-LITHO., WASHINGTON, D. C.

UNITED STATES PATENT OFFICE.

CONRAD BREITSCHWERTH, OF SYRACUSE, NEW YORK.

PROCESS OF PREPARING CLAY FOR MANUFACTURING POTTERY, &c.

SPECIFICATION forming part of Letters Patent No. 621,212, dated March 14, 1899.

Application filed April 18, 1895. Serial No. 546,231. (No specimens.)

*To all whom it may concern:*

Be it known that I, CONRAD BREITSCHWERTH, of Syracuse, in the county of Onondaga, in the State of New York, have invented new and useful Improvements in Processes of and Apparatus for Preparing Clay for the Manufacture of Pottery or Earthenware, Brick, or other Articles, of which the following, taken in connection with the accompanying drawings, is a full, clear, and exact description.

Flower-pots are at present made from "wet" clay molded into shape and burned in a kiln. The large amount of moisture in the material causes great shrinkage, commonly producing surface and bottom checks or cracks, and in addition the contracting of the vertical sides causes the bottom to bulge upward, so that the center of the bottom is higher than its edge, thus creating a "trough," which holds water and causes "pot-rot." Furthermore, the unequal shrinkage, inseparably connected with the drying step of pots made from wet clay, causes the pots to assume a distorted shape, which not only lessens the value of the product by injuring its appearance, but also prevents a perfect "nesting" of the pots. Again, it is a well-known fact that flower-pots must be porous and that their efficiency is proportional to their porosity, and it is equally well known that flower-pots as at present made frequently, if not usually, are so dense as to be deficient in respect to absorption of moisture, &c., from the atmosphere and exhalation.

The principal object of my invention is to provide a process of treating clay which will bring the clay to such condition as that flower-pots, &c., made from it will possess greater porosity than at present, be of uniform shape, and free from surface or bottom checks or cracks and bottom troughs.

In practicing this process the clay in its normal condition as to moisture—that is to say, without the addition of water thereto—is first crushed or otherwise reduced to a homogeneous stratified condition of particles of substantially the same size. With the apparatus hereinafter described this primary step of the process squeezes the clay into flat sheets or strata, crushes out all lumps, evenly distributes the moisture, and if the clay is wet beyond a certain degree expresses the surplus water, so that the mass of ground clay is homogeneous as to dryness, texture, grain, and quality; but the clay is not yet in condition to produce flower-pots or other articles of pottery-ware having the advantages accomplished by my invention, as it is still in rather a cohesive condition, somewhat, though not completely, analogous or similar to its condition when plastic. Hence it is next compressed or otherwise formed into sticks or bars. This step of the process creates a grain, so to speak, running longitudinally of the stick or bar and also compacts the particles. The clay is now in a granular condition, and when in this condition is finally reduced to mass of loose or flaky particles or granules of clay, which are non-adhesive and non-cohesive except under heavy pressure. This final step as practiced by me consists in grinding the ends of the sticks transverse to the grain thereof. During the formation of this granular dry clay into flower-pots the following peculiarities are noticeable, to wit: When subjected to hydraulic pressure of many tons while in a pot-mold, the clay is compacted to shape, thickness, and hardness, no water is squeezed out, and the finish is smooth. The green pots nest together perfectly in stacking and hold their form and shape accurately and perfectly, as they cannot sag down, as is the case with green pots made from clay rendered plastic by the use of water. When green pots made from this granular clay are burned in the kiln, there is so little water to be evaporated that the shrinkage is merely nominal, thus producing a pot having no checks or cracks in the vertical walls and formed with interiorly-concave bottoms, giving perfect drainage. Furthermore, from the granular condition of the green prepared clay it results that when it is compressed these grains do not entirely close up the interstices between them, so that the pot is much more porous than one made from plastic clay.

In short, flower-pots made from clay treated according to the process above set forth will, as compared with those made from wet clay, be stronger, more uniform shape, and will insure a better and more certain life and growth of plants.

A suitable apparatus for carrying out this process is shown in the accompanying drawings, in which—

Figure 2:
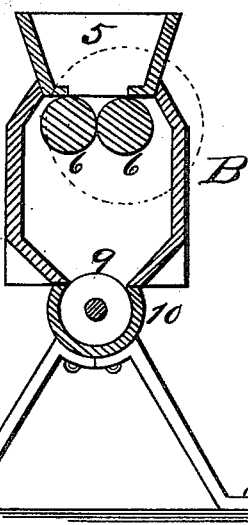
Figure 3:
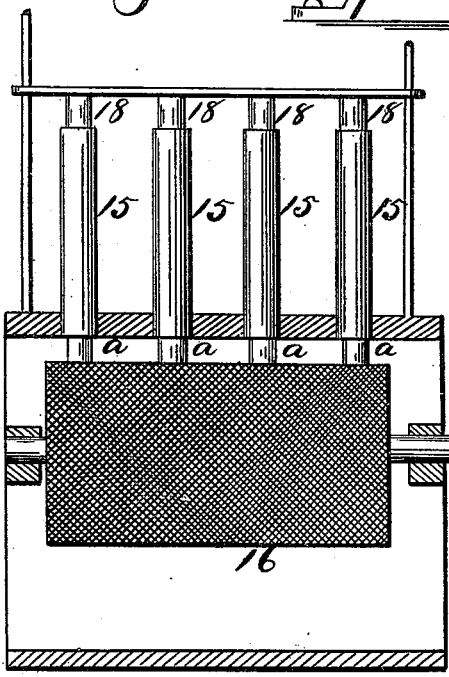
Figure 4:
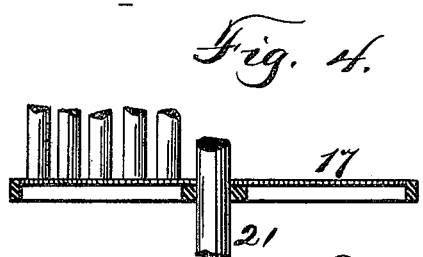
Figure 5:
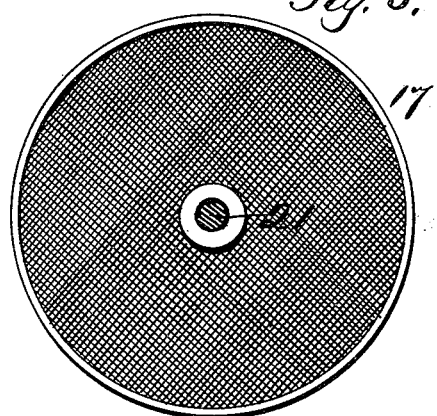

Figure 1 is a longitudinal sectional elevation of the several parts or members of said apparatus. Fig. 2 is a transverse section of the crusher and compressor. Fig. 3 is a sectional elevation of the cylindrical grinder and the stick-holders and feeding mechanism. Fig. 4 is a top plan of a flat horizontal grinder. Fig. 5 is a section of the same.

A is a suitable box provided with suitable means for heating the clay placed therein, as a steam-pipe 2 for thawing it if frozen, and, in general, to bring it to a proper condition to be worked, the clay being placed therein in its natural condition as it comes from the earth, the arrows 3 indicating its entering said heater and the arrows 4 its removal therefrom in any ordinary way, as by shoveling, and its being fed into the crusher B. This consists of a suitable frame or box, a hopper 5, mounted thereon, rollers 6, mounted upon suitable shafts journaled in said frame and driven by a pulley 7, said shafts being provided with intermeshing gears 8 in the usual manner, whereby the rotation of one shaft and roller drives the other shaft and its roller in the opposite direction. These rollers are closely set, and the clay is drawn through between them and squeezed and compressed and crushed, both as to the lumps and also as to any gravel, stones, or other foreign substances therein, and all is rendered homogeneous thereby. From these crushers the crushed clay falls into a worm 9, mounted in a suitable and partly cylindrical chamber 10, said worm being driven by the gears 11 12, driven by a gear 8. The crushed clay is fed through the cylinder and compressed and forced out through one or more openings 13 in the head 14 and formed into sticks a, substantially as shown by the dotted lines, and broken off to any length desired. So far the process is substantially continuous, so that these sticks will be heated. Usually they are laid away until cool and are then taken and placed in the tubular holders 15, so that their lower ends rest upon the grinder and sieve combined, (16 in Figs. 1 and 3 or 17 in Figs. 4 and 5,) and 18 18 are weights resting upon them to feed them downward. The grinder and sieve 16 consists of a cylindrical body 19 of wire-sieve work of suitable mesh mounted upon suitable heads 20, which in turn are secured upon a shaft 21, which is driven by suitable means to rotate said grinder, and the roughness of the bars or wires creating the mesh will grind off the ends of the sticks, the greater part at least of the ground clay passing through into the body of the cylinder and thence escaping through the mesh into the chamber in the casing below said grinder and is then ready for use.

In Figs. 4 and 5 the grinder and sieve 17 is flat and the sticks bear upon its sieve-like body and are ground by its rotation, it being mounted upon and driven by the central shaft 23. In either case the result is the same as to grinding and sieving the clay.

In Fig. 1 an air-blast pipe 24 is shown so located as to discharge a jet or jets or a blast of air into the body of the grinder to blow off all of the adhering clay and clean the meshes of the grinder.

I am aware that processes for treating clay for the manufacture of bricks, drain-tiles, &c., having some points of similarity to that invented by me have heretofore been proposed; but said previous processes do not produce a clay having the characteristics of that essential to attain the advantages produced by the present invention, and, on the other hand, clay treated by the process herein described is not suitable for the manufacture of drain-tiles or bricks.

In the manufacture of drain-tiles and bricks the aim is to reduce the porosity of the product to a minimum, and the clay is therefore ground as fine as possible, so that the product will be most "dense and compact," while clay after being treated by the process hereinabove set forth instead of being "crushed or ground to a fine powder," or "pulverized," is reduced to a mass of dry coarse granules or a mealy, fluffy, or flaky condition, so that it lies up loose, somewhat like bran, and it is wholly free from dust and neither soggy with water nor sticky and salve-like, like plastic clay. Such a condition of clay is not practical for bricks or drain-tiles, for they would be so porous as to absorb moisture too readily and freely and would be too easily crushed, while this very feature of its extreme porosity makes of it a flower-pot having very great advantages over any flower-pot formed of clay treated in accordance with any method heretofore known. When this so-prepared clay is used in making flower-pots in smooth dies by pressure, the outer surface of said pot when viewed under a magnifying-glass will bear an appearance of porosity similar to that of the back of the human hand under a glass, and its porosity is so extreme as that an eight-inch pot when filled with water will empty itself by its porosity in about ten hours. Thus it has an infinitely greater power of absorbing liquid and atmospheric food for the plants and of preventing retention in the pot of excess water or the accumulation of water therein than pots made of clay treated by any of the known processes. Furthermore, the pots will be neater and more uniform in appearance, and when struck by the hand will ring like a bell.

In Fig. 1 I show the worm provided with teeth 25 between the flights, by which the crushed clay is stirred or cut up and mixed and rendered more homogeneous, all so that the sticks are more uniform and not composed of layers or laminæ, and consequently the clay is better prepared for grating and the sticks will not split nor chip nor flake while cooling, if heated, or while being ground.

Having described my invention, what I claim, and desire to secure by Letters Patent, is—

1. The process herein described of making flower-pots and other articles of pottery-ware requiring extreme porosity, consisting first in reducing the clay to a mass of dry coarse granules, so as to be flaky, fluffy or mealy in condition, second causing said granules to adhere and produce the shape of the product desired, and finally burning the latter, substantially as described.

2. The process herein described of treating clay for use in the manufacture of flower-pots or other articles requiring extreme porosity, consisting of the following steps, to wit: first, reducing the clay in its normal condition as to moisture to uniform fineness; second, forming it into bars or sticks; and finally reducing said bars or sticks to a mass of dry coarse granules, or mealy, fluffy or flaky particles, substantially as described.

3. The process herein described of treating clay for use in the manufacture of flower-pots or other articles requiring extreme porosity, consisting of the following steps, to wit: first, subjecting the clay, in its normal condition as to moisture, to compression so as to reduce it to a homogeneous, stratified condition of particles of the same size and express surplus water; second, forming it into sticks or bars having a longitudinal grain; third grating the bars transversely to the grain thereof: thus producing a mass of dry coarse granules, or mealy, fluffy or flaky particles substantially free from dust, substantially as described.

In witness whereof I have hereunto set my hand on this 12th day of April, 1895.

CONRAD BREITSCHWERTH.

In presence of—
  C. W. SMITH,
  HOWARD P. DENISON.